Figure 1:
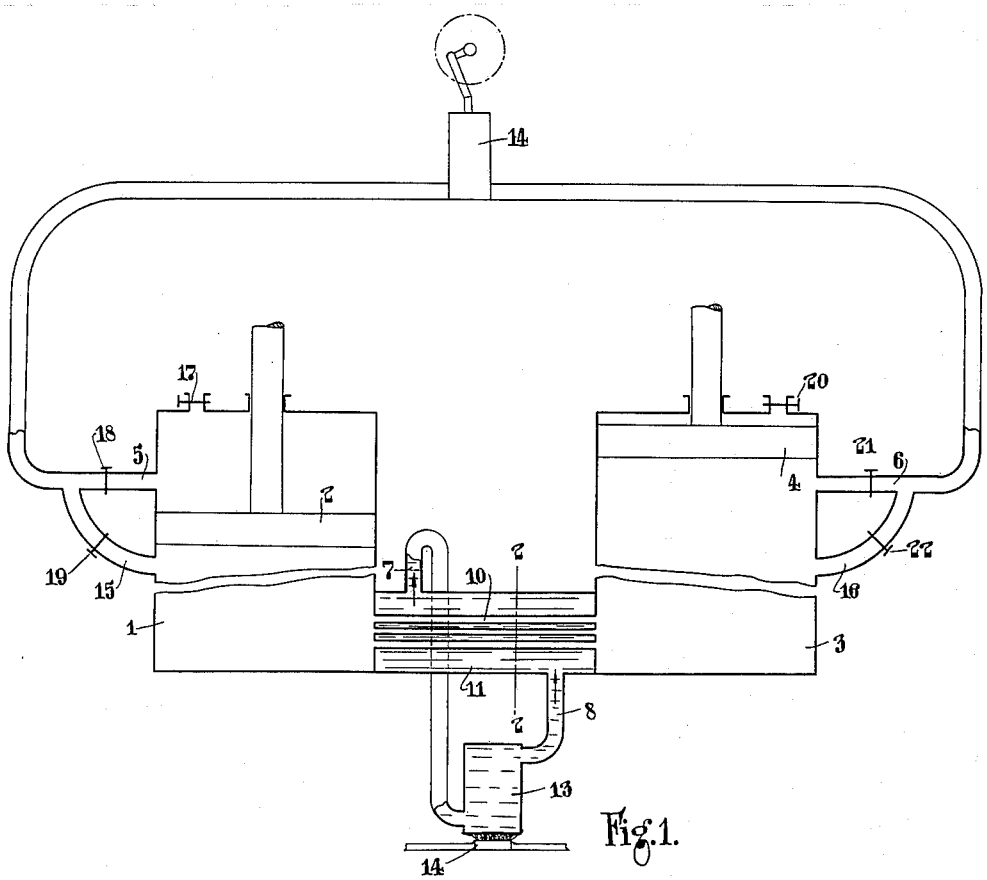

A. T. COCKING.
MANUFACTURE OF EXPLOSIVES.
APPLICATION FILED DEC. 9, 1912.

1,164,170. Patented Dec. 14, 1915.

Allan T. Cocking, Inventor:-
by
Attorney:-

UNITED STATES PATENT OFFICE.

ALLAN THOMAS COCKING, OF BIRMINGHAM, ENGLAND, ASSIGNOR TO KYNOCH LIMITED, OF BIRMINGHAM, ENGLAND.

MANUFACTURE OF EXPLOSIVES.

1,164,170.  Specification of Letters Patent.  Patented Dec. 14, 1915.

Application filed December 9, 1912. Serial No. 735,793.

*To all whom it may concern:*

Be it known that I, ALLAN THOMAS COCKING, a subject of the King of Great Britain and Ireland, and resident of Lion Works, Witton, Birmingham, in the county of Warwick, England, have invented certain new and useful Improvements Relating to the Manufacture of Explosives, of which the following is a specification.

This invention relates to the manufacture of blasting gelatin or gelatin pulp, that is to say, the product resulting from the incorporation of nitro-cotton with nitroglycerin, the amount of the latter being over 90 per cent. of the product.

One of the most serious sources of danger in making this explosive material in the usual way is the drying of the nitro-cotton and the use of it in this condition, and furthermore the solution of the nitro-cotton in the nitroglycerin involves a relatively lengthy malaxation after the initial incorporation in order to produce a homogeneous product.

Now it has been observed that a method which has been proposed for the incorporation of nitro-cellulose with nitro-glycerin without drying the former if used to incorporate small proportions of nitro-cotton in nitroglycerin in making blasting gelatin, produces relatively complete solution of the nitro-cotton in the nitro-glycerin and gives a product requiring but little further treatment, if any, to secure the desired homogeneity. This previously proposed method consists in bringing the nitro-cellulose while still wet into contact with the nitro-glycerin. But while the ingredients of the material so obtained are satisfactorily mixed the product has the disadvantage of retaining rather tenaciously some of the water taken into the mixture by the wet nitro-cotton.

According to the present invention the plastic mass obtained as indicated, that is by bringing the gelatinizing agent while still wet into contact with nitro-glycerin, is freed of this water which it holds so tenaciously by finely subdividing it into cords, films or the like, warming it to an appropriate degree and then exposing it in this condition in the chamber in which a partial vacuum is maintained the material being recombined when the moisture has in this way been expelled.

Thus, in carrying this invention into effect in one form, nitro-cotton still containing say 20 to 30 per cent. of water, is directly mixed with the desired amount of nitro-glycerin, preferably at a temperature of 40° C. to 60° C., whereby a jelly-like product is obtained. The material is now placed in a receptacle, which communicates with a chamber under reduced pressure, by means of a relatively large number of flat passages, the walls of which are of good heat-conducting material, and around which a warming medium such as hot water is adapted to circulate. The reduced pressure which exists in the chamber draws the material through these passages, and in so doing sub-divides it into films, which become heated by the warming medium surrounding these passages, and more readily give up their water when they enter the vacuum chamber. The material may be withdrawn from the vacuum chamber at intervals, or may be again sub-divided and treated by creating reduced pressure in the receptacle into which the material was first introduced.

The regularity of flow of the material can be assisted by ramming by a piston or otherwise the material in the first chamber sufficiently tightly to prevent the formation of gas channels therein.

Figure 2:
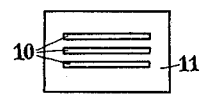

Figure 1 diagrammatically represents a scheme for carrying the invention into effect in one form; Fig. 2 is a section on the line 2—2 of Fig. 1.

This form comprises two cylinders 1 and 3 with pistons 2 and 4 respectively. The cylinders are connected by a passage 11 containing thin flat tubes 10 which can be heated by water warmed and circulated from the cistern 13 by the flame 14 the cistern communicating with the passage 11 by pipes 7 and 8 respectively, the latter leading water to the passage and the former permitting its exit therefrom.

The cylinders 1 and 2 can be placed under reduced pressure by means of a suction pump 14 communicating with them by pipes 5 and 15, and 6 and 16 respectively. Controlling valves 17 to 22 are provided where desired, 17 and 20 in the cylinders 1 and 3 and 18 and 19 in the suction pipes for cylinder 1, with 21 and 22 in the suction pipes for cylinder 3.

In operation the cylinder 1, say, is filled in any suitable manner with the nitrocellulose and nitroglycerin. The piston 2 is then caused to descend for the purpose of consolidating the mixture. The pump 14 is then caused to suck from the cylinder 3 by way of the pipes 6 or 16 or both, the valves 21 and 22 being opened as necessary it being assumed that the piston 4 is at the top of its stroke or substantially so, and that warm water is circulating in the passage 11. The result is that the nitroglycerin nitrocellulose substance is drawn through the passages 10 in a state of more or less fine division and in this state is subjected to the action of heat from the water, and to diminished pressure by the suction pipe. After all the material has been drawn from the cylinder 1 into the cylinder 3 it may be removed from the latter, or the suction action can be reversed so that it is drawn back again from the cylinder 3 into the cylinder 1, the valves being suitably operated for this purpose. After it has been treated the desired number of times it is removed from the apparatus.

The material is preferably heated to a temperature of from 50° C. to 55° C. or thereabout.

Having now described my invention, what I claim is:—

1. The process comprising incorporating nitroglycerin and wet nitrocellulose; shredding the mass, warming the shredded material, subjecting the same to a reduced pressure and re-consolidating the mass for the purpose described.

2. In the art of making blasting gelatin involving the use of wet nitro-cotton the process comprising the steps of subjecting such moisture-containing gelatin to heat while the mass is sub-divided to expose a large surface and applying diminished pressure to the mass for withdrawing the moisture content.

In testimony whereof I have signed my name to this specification in the presence of two subscribing witnesses.

ALLAN THOMAS COCKING.

Witnesses:
JOHN MORGAN,
FRANCIS MALPAS.